(12) United States Patent
O'Kell et al.

(10) Patent No.: US 10,543,780 B2
(45) Date of Patent: Jan. 28, 2020

(54) ILLUMINATION APPARATUS

(71) Applicant: SAF-T-GLO LIMITED, Swaffham (GB)

(72) Inventors: Sean Patrick O'Kell, Penarth (GB); Andrew Jon Hallett, Cardiff (GB)

(73) Assignee: SAF-T-GLO LIMITED (GB)

( * ) Notice: Subject to any disclaimer, the term of this patent is extended or adjusted under 35 U.S.C. 154(b) by 0 days.

(21) Appl. No.: 15/779,290

(22) PCT Filed: Nov. 28, 2016

(86) PCT No.: PCT/GB2016/053734
§ 371 (c)(1),
(2) Date: May 25, 2018

(87) PCT Pub. No.: WO2017/089837
PCT Pub. Date: Jun. 1, 2017

(65) Prior Publication Data
US 2018/0345855 A1 Dec. 6, 2018

(30) Foreign Application Priority Data
Nov. 26, 2015 (GB) .................................. 1520896.0

(51) Int. Cl.
*B60Q 3/44* (2017.01)
*G09F 13/20* (2006.01)
(Continued)

(52) U.S. Cl.
CPC .................. *B60Q 3/44* (2017.02); *B60Q 3/88* (2017.02); *B64D 11/0624* (2014.12);
(Continued)

(58) Field of Classification Search
CPC ........ B60Q 3/44; B60Q 3/88; B64D 11/0624; B64D 47/02; G09F 13/14; G09F 13/20; G09F 21/10
See application file for complete search history.

(56) References Cited

U.S. PATENT DOCUMENTS

2002/0153510 A1* 10/2002 Sun .................... C04B 35/195
                                                    252/301.4 P
2007/0024173 A1*  2/2007 Braune ................ H01L 33/502
                                                            313/485

FOREIGN PATENT DOCUMENTS

EP    2717245    4/2014
FR    2800023    4/2001
(Continued)

OTHER PUBLICATIONS

International Search Report re PCT/GB2016/053734 dated Feb. 2, 2017; 3 pages.

*Primary Examiner* — Robert J May
*Assistant Examiner* — Leah Simone Macchiarolo
(74) *Attorney, Agent, or Firm* — Foley & Lardner LLP

(57) ABSTRACT

Non-emergency illumination apparatus (10) arranged in use to mark a location of an article, fixture or fitting in an aircraft cabin, the apparatus including: an emitting layer (2) including a photoluminescent material, the photoluminescent material emitting visible light in a first region of the electromagnetic spectrum in response to excitation by light from a second region of the electromagnetic spectrum, different to the first region; and a protective layer (6) overlying the emitting layer, the protective layer transmitting light from the first and second regions of the electromagnetic spectrum, wherein the non-emergency illumination apparatus is constructed and arranged to be placed in proximity to an article, fixture or fitting, such that the apparatus marks the location of the article, fixture or fitting when excited by light from the (Continued)

second region of the electromagnetic spectrum. The illumination apparatus can comprise a carrier matrix. The illumination apparatus aids location of items such as headphone sockets and power sockets in low lighting conditions so calming passengers.

23 Claims, 3 Drawing Sheets

(51) Int. Cl.
| | | |
|---|---|---|
| *B64D 11/06* | (2006.01) | |
| *B64D 47/02* | (2006.01) | |
| *B60Q 3/88* | (2017.01) | |
| *G09F 13/14* | (2006.01) | |
| *B64D 11/00* | (2006.01) | |
| *G09F 13/04* | (2006.01) | |

(52) U.S. Cl.
CPC .............. *B64D 47/02* (2013.01); *G09F 13/14* (2013.01); *G09F 13/20* (2013.01); *B64D 2011/0038* (2013.01); *G09F 2013/044* (2013.01)

(56) References Cited

FOREIGN PATENT DOCUMENTS

| GB | 2177856 | 1/1987 |
|---|---|---|
| WO | WO01/60943 | 8/2001 |
| WO | WO2011/046642 | 4/2011 |
| WO | WO2013/036270 | 3/2013 |

\* cited by examiner

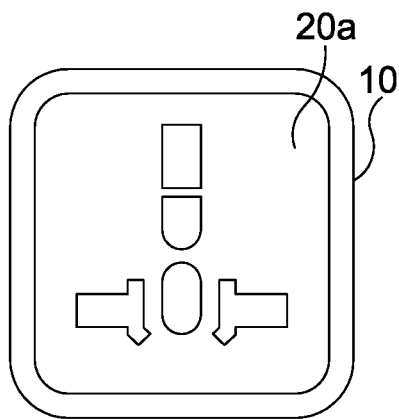
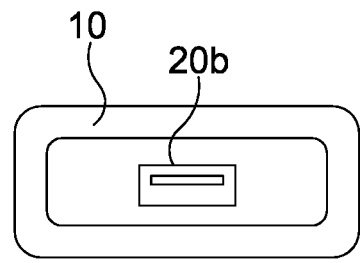
FIG. 3A
FIG. 3B
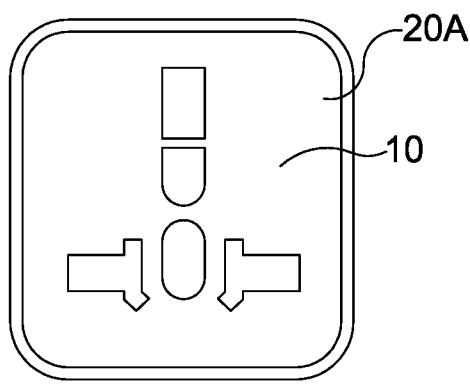
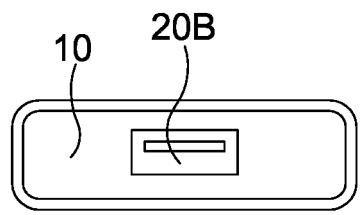
FIG. 4A
FIG. 4B

30

40

50

ILLUMINATION APPARATUS

The present invention relates to illumination apparatus. In particular, but not exclusively, the present invention relates to an apparatus for illuminating articles, fixtures or fittings such as power or media sockets in aircraft passenger cabins in low lighting conditions.

Passengers are increasingly using their own electronic devices such as mobile phones (cell phones), laptop computers and tablets during flights on aircraft. On long haul journeys, these electronic devices may require charging. Therefore, many aircraft now have universal power outlets and USB ports on or around the seats, in addition to the typical ports for in-flight entertainment systems, such as for headphones.

Many of the sockets (power outlets, USB ports, headphone ports and the like) are located in areas which are difficult to locate in the dark, such as when a dim light setting is used during night flights. It is a particular problem on night flights as a passenger struggling to locate a power outlet or USB port or headphone socket in the dark can cause significant disturbance to an adjacent passenger who may be sleeping to attempting to sleep.

According to a first aspect of the invention, there is provided non-emergency illumination apparatus arranged in use to mark a location of an article, fixture or fitting in an aircraft cabin, the apparatus including: an emitting layer including a photoluminescent material, the photoluminescent material emitting visible light in a first region of the electromagnetic spectrum in response to excitation by light from a second region of the electromagnetic spectrum, different to the first region; and a protective layer overlying the emitting layer, the protective layer transmitting light from the first and second regions of the electromagnetic spectrum, wherein the apparatus is constructed and arranged to be placed in proximity to an article, fixture or fitting, such that the apparatus marks the location of the article, fixture or fitting when excited by light from the second region of the electromagnetic spectrum.

The apparatus provides a marking that does not require power, is lightweight and simple to manufacture, durable and scratch resistant.

Desirably the article has an aesthetically pleasing appearance in daylight or illuminated conditions.

An illumination apparatus in accordance with the invention overcomes a number of problems that have been encountered particularly with night flights. Some night flights may be a matter of 2 to 4 hours duration but others may be longer such as 6 hours or 8 hours or for some overnight flights the flight may be up to 12 or 16 hours duration. On overnight flights the cabin lighting is turned down very low significantly reducing illumination. The low lighting assists passengers in sleeping.

In some aircraft the lighting used in the cabin for overnight flights is blue light. This has been found to be more calming for passengers while providing sufficient illumination to allow passengers and cabin staff to move around the cabin when necessary.

The human eye has been found to have three different vision regimes. It has been known that the human eye has three known types of photoreceptor cells in the eye. These are rods, cones and photosensitive retinal ganglion cells. During daylight with high ambient light levels vision is mediated by cones which are responsive to red, green and blue regions of the visible spectrum. This is known as photopic vision. Photopic vision applies at luminance level of greater than 10 cd/m2.

In low light levels the vision is mediated by rods only. This is known as scotopic vision and applies to luminance levels of less than 0.3 mcd/m2. In scotopic vision it is known that the human eye does not perceive colour and objects are perceived as different tones of grey. Once the human eye has been dark adapted then vision relies solely on the signal from the rods. The rods are smaller than cones and are distributed across the retina. The rod cells are more than 100 times more sensitive than cones and are sensitive enough to respond to a single photon of light.

Mesopic vision relates to light levels between the photopic and scotopic vision regimes; that is: 0.003 cd/m2<mesopic luminance<10 cd/m2.

In overnight flight conditions the human eye is assumed to be dark adapted and utilising scotopic vision. The photoluminescent material is assumed not to be fully charged as the cabin will have been dark for a period of time.

Under scotopic vision conditions the human eye has maximum sensitivity at around 498 nm. Preferably photoluminescent material is arranged to emit at a wavelength close to that of maximum sensitivity of scotopic vision. Alternatively the photoluminescent material is arranged to emit a range of wavelengths encompassing wavelengths which are close to wavelengths of maximum sensitivity of scotopic vision.

It has been found that passengers have some difficulty in locating articles fixtures or fitting, including power connections and media connections in the low level lighting of an overnight flight. In such conditions it has been found that a passenger searching for a connection, article fixture or fitting can cause significant disturbance to an adjacent passenger.

The illumination apparatus in accordance with the first aspect of the invention can assist a passenger in locating the desired article, fixture, fitting or connection without difficulty and without causing a disturbance to an adjacent passenger. Improved ease of location improves the passenger experience and also reduces disturbance to adjacent passengers so improving a flight experience of the adjacent passenger as well.

The article fixture or fitting may comprise one or more of:
Power socket or power socket surrounds;
USB socket or USB socket surrounds;
Headphone sockets or headphone socket surrounds;
Seat numbers;
Seat edges;
Remote control identifiers;
Overhead bin trims;
Overhead bin handle locators;
Informational signage;
Light switches and call switches (for flight attendants);
Passenger Service Unit (PSU) informational signs;
PSU call buttons/light switches.

The light from the second region of the excitation spectrum may be visible light.

The light from the second region may be from the violet or blue region of the visible spectrum. Alternatively the light from the second region may be form the ultraviolet region of the electromagnetic spectrum.

The second region of the visible spectrum may be between 250 nm and 500 nm and preferably between 400 nm wavelength and 500 nm wavelength.

The visible light emitted by the photoluminescent material may be green light.

The visible light may include a range of wavelengths, with a maximum intensity at approximately 520 nm.

The photoluminescent material may comprise one pigment or may comprise a main pigment and at least one additional pigment. The or each additional pigment may be used to modify a range of wavelengths emitted by the photoluminescent material and to adjust a perceived emitted colour.

The emitting layer may include a matrix of a synthetic resin or polymeric structure, with the photoluminescent material distributed through the matrix.

It will be appreciated that an aircraft cabin can be perceived to be relatively small. It is desirable to provide a uniform and uncluttered décor in order to improve the perception of space to passengers when the cabin is full lit. It is an object of the invention to provide an article that blends in with the cabin décor during daylight or when the cabin is fully lit.

The apparatus may comprise a second colour layer, provided between the emitting layer and the protective layer, wherein, in first light conditions, the apparatus appears a first colour from the emitting layer, and in second, different light conditions, the apparatus appears a second colour, different from the first.

The second light conditions may include light emitted from a third region of the electromagnetic spectrum. The third region may include and extend beyond at least the second region of the electromagnetic spectrum.

The second lighting conditions may be daylight or white light. The third region may include UV radiation.

The apparatus may comprise indicia or markings. The apparatus may comprise a colour filter or colour modifier. The colour layer may comprise a colour film. The colour film may comprise plain colours or may comprise a patterned layer.

The indicia or markings may be formed by selective placement of the photoluminescent material. Alternatively, the indicia or markings may be formed by patterning regions of the protective layer to be opaque to light in the first region of the electromagnetic spectrum. In some embodiments the colour modifier may be provided over some or all of the photoluminescent material. One or more colour modifiers may be used.

In some embodiments the apparatus may have a plain colour modifier such that the apparatus blends in with a back ground décor of the cabin. The plain colour modifier could be any colour. In other embodiments the apparatus may have a patterned colour modifier. The patterned colour modifier may be arranged to modify the light emitted by the apparatus to match that of the surrounding material. In such embodiments the apparatus blend in with the surrounding décor in the second light conditions.

In a preferred embodiment the colour layer reflects at least some of the light from the cabin. Desirably the appearance of the illumination apparatus from the reflected light is different from the appearance of the illumination apparatus from emitted light.

In the first light conditions the cabin may be have low lighting or no lighting. Alternatively the lighting may be of a particular hue such as blue. In the first lighting condition the light emitted by the photoluminescent material is visible.

In the second light conditions which may be bright white light or daylight the emitted light has a much lower luminosity than the white light or daylight and the eye perceives the apparatus having a colour controlled or modified by the colour layer. The eye may perceive an appearance of the illumination apparatus as a result of reflected light.

In alternative embodiments the apparatus may be provided with a colour film forming the second colour layer such that the apparatus resembles a wood trim in the second light conditions. Such a colour film may be used in a cabin. The colour film may comprise a patterned or coloured filter.

The colour film or modifier may allow all light emitted from the photoluminescent material to be transmitted. Alternatively the colour film or modifier may allow only a part of the light emitted by the photoluminescent material to be transmitted. The colour film or modifier may comprise a one or a plurality of regions. The plurality of regions may be arranged to transmit different spectra of light. Each region of the apparatus may have the same photoluminescent material or each region may be provided with different photoluminescent material. Each photoluminescent material may emit light having a different spectral range.

The illumination apparatus overcomes the problem of providing a means of directing a passenger to a location of the required article in low lighting or dark conditions by means of an apparatus that is discreet in daylight conditions.

The apparatus may comprise a substrate, the emitting layer being mounted on the substrate.

The emitting layer, protective layer and, where provided, substrate and second colour layer may be joined by adhesive layers.

At least the adhesive layers provided above the emitting layer may transmit light from the first and second regions of the electromagnetic spectrum. For example the or each adhesive layer above the emitting layer may be transparent or substantially transparent.

The protective layer, as part of the emissive layer or as a separate layer may comprise polyester (PET) or polycarbonate (PC) or polyvinyl chloride (PVC) or polymethylmethacrylate (PMMA) or polyurethane (PU). The material selected for the protective layer may be selected depending on the intended location of the apparatus. In some locations a harder protective layer may be required and a PC protective layer may provide optimum protection. In other intended locations of the apparatus it may be desirably that the apparatus is more flexible and a PVC or PET layer may be optimum.

It will be appreciated that the protective layer may absorb some of the emitted light from the photoluminescent material. The protective layer may be at least partially transparent to light emitted by the photoluminescent material. The protective layer may be at least partially transparent to wavelengths required to charge the photoluminescent material. Preferably the protective layer is transparent to emitted light and wavelengths required to charge the photoluminescent material.

Desirably the protective layer is selected such that the performance of the apparatus is not reduced below 5 mcd/m$^2$ and preferably not reduced below 15 mcd/m$^2$ and most preferably not below 25 mcd/m$^2$ after 10 mins DIN67510.

In a preferred embodiment the protective layer comprises a PC layer. Desirably when the PC layer or any additional layer is included the apparatus is arranged as an assembly to be meet FAR/CS-25.853 App. F Part 1 (a)(1)(iv) 15 seconds horizontal. The polycarbonate may be a film. Advantageously the protective layer prevents damage to the illumination apparatus in the restricted confines of an aircraft cabin where passengers and passenger's bags are in close and repeated contact with seats and other parts of the cabin equipment and in which the wear inflicted on the illumination apparatus on cabin equipment.

Desirably the protective layer improves scratch resistance and abrasive resistance. It will be appreciated that a sturdy protective layer reduces the damage that can be caused by a passenger.

The photoluminescent material may be strontium aluminate. Desirably the pigment comprises a high performing strontium aluminate. The pigment in the carrier material may comprise a pigment that can provide an afterglow of >50 mcd/m$^2$ after 10 mins according to DIN65710. More preferably the afterglow is >100 mcd/m$^2$ after 10 mins according to DIN 65710. In a preferred embodiment the photoluminescent material comprises one or more of the group comprising: $SrA_2lO_4$:Eu,Dy; $SrAl_4O_7$.Eu,Dy; $SrAl_{12}O_{19}$.Eu,Dy; $Sr_2Al_6O_{11}$:Eu,Dy; $Sr_4Al_2O_7$:Eu,Dy; $Sr_4Al_{14}O_{25}$:Eu,Dy; $Sr_7Al_{12}O_{25}$Eu,Dy.

In a particularly preferred embodiment the main pigment comprises Strontium Aluminate ($SrAl_2O_4$) doped with Europium and Dysprosium.

The apparatus may be constructed and arranged to be provided on a face of an article, fixture or fitting. The edges of the apparatus may include a bezel shape. A bezel shape to an apparatus provides an edge that is less easy for a passenger to damage.

The apparatus may be constructed to be provided in a channel formed between an article, fixture or fitting and an edge of a depression or aperture arranged to receive the article, fixture or fitting.

According to a second aspect of the invention, there is provided a use of non-emergency illumination apparatus to mark a location of an article, fixture or fitting in an aircraft cabin, the apparatus including: an emitting layer including a photoluminescent material, the photoluminescent material emitting visible light in a first region of the electromagnetic spectrum in response to excitation by light from a second region of the electromagnetic spectrum, different to the first region; and a protective layer overlying the emitting layer, the protective layer transmitting light from the first and second regions of the electromagnetic spectrum, wherein the apparatus is constructed and arranged to be placed in proximity to an article, fixture or fitting, such that the apparatus illuminates the article, fixture or fitting when excited by light from the second region of the electromagnetic spectrum.

According to a third aspect of the invention, there is provided a socket for use in an aircraft cabin, the socket comprising a connector for connecting a piece of user equipment to a central system of the aircraft; a non-emergency illumination apparatus according to the first aspect, the socket illumination apparatus illuminating the connector in at least first lighting conditions.

Preferably the first lighting condition comprises low or no lighting conditions.

Preferably the central system comprises a power or entertainment system of the aircraft.

The connector may be a power outlet; a USB outlet; or a headphone socket.

Desirably the socket and illumination apparatus comprises a colour film or colour modifier. The colour film may be arranged to blend in with the cabin décor as described in relation to the first aspect of the invention.

Preferably the socket and illumination apparatus is provided with a protective layer. Advantageously the protective layer may prevent damage to the illumination apparatus and the socket as described with reference to the first aspect of the invention.

Preferably the photoluminescent material may be selected to provide a performance of at least >50 mcd/m$^2$ and preferably >150 mcd/m$^2$ after 10 mins according to DIN67510. In a preferred embodiment the spectral range of wavelengths emitted by the photoluminescent material preferably encompasses the range of wavelengths to which the human eye is sensitive in scotopic vision.

It will be appreciated that use of emitted wavelengths to which the human eye is sensitive when dark adapted permits use of photoluminescent materials that have a less strong luminance or provide useful luminance for longer periods of time which may be a particular advantage in the course of overnight flights when the lighting does not allow for charging of the photoluminescent material.

According to a fourth aspect of the invention, there is provided a seating unit for an aircraft, the seating unit comprising one or more seats, each seat including one or more sockets according to the third aspect.

According to a fourth aspect of the invention, there is provided a method of illuminating a socket for a power or entertainment system in an aircraft cabin using a photoluminescent marker wherein the marker comprises an emitting layer including a photoluminescent material emitting visible light in a first region of the electromagnetic spectrum in response to excitation by light from a second region of the electromagnetic spectrum, different to the first region; and a protective layer overlying the emitting layer, the protective layer transmitting light from the first and second regions of the electromagnetic spectrum.

Preferably the photoluminescent material comprises one pigment or may comprise a main pigment and at least one additional pigment. The or each additional pigment may be used to modify a range of wavelengths emitted by the photoluminescent material and to adjust a perceived emitted colour.

The apparatus may comprise a second colour layer, provided between the emitting layer and the protective layer, wherein, in first light conditions, the apparatus appears a first colour from the emitting layer, and in second, different light conditions, the apparatus appears a second colour, different from the first.

The second light conditions may include light emitted from a third region of the electromagnetic spectrum. The third region may include and extend beyond at least the second region of the electromagnetic spectrum.

The second lighting conditions may be daylight or white light. The third region may include UV light.

The apparatus may comprise indicia or markings or the apparatus may comprise a colour layer, colour filter or colour modifier. The colour layer may comprise a colour film. The colour film may comprise plain colours or may comprise a patterned layer.

In some informational signs the information may be printed on the emitting layer or on the protective layer. Printed areas typically block some or all of the emitted light enabling the eye to differentiate between the printed and non-printed areas and to read the information provided or to identify the signage. Typically printed areas will block from 40% to 100% of the emitted light. In a preferred embodiment the printed areas may block from 50% to 98% or more preferably from 60% to 95% or most preferably from 70% to 93% of the emitted light. In a particularly preferred embodiment the printed area blocks around 90% of the emitted light.

It will be appreciated that the described illumination apparatus may be used in new aircraft.

According to a further aspect of the invention there is provided a method of retrofitting an aircraft with non-emergency illumination apparatus in accordance with the first aspect of the invention in which the non-emergency illumination apparatus is secured to or around an article, fixture or fitting in the aircraft cabin.

Preferably non-emergency illumination apparatus is secured to or around a connection to a central system of the aircraft.

Embodiments of the invention will now be described by way of example only, with reference to the drawings, in which:

FIG. 1 schematically illustrates a sectional view through a socket illumination apparatus;

FIG. 3A illustrates an example of a power socket including a first embodiment of the socket illumination apparatus;

FIG. 3B illustrates an example of a USB socket including the first embodiment of the socket illumination apparatus;

FIG. 4A illustrates an example of a power socket including a second embodiment of the socket illumination apparatus;

FIG. 4B illustrates an example of a USB socket including the second embodiment of the socket illumination apparatus;

Figure 1:
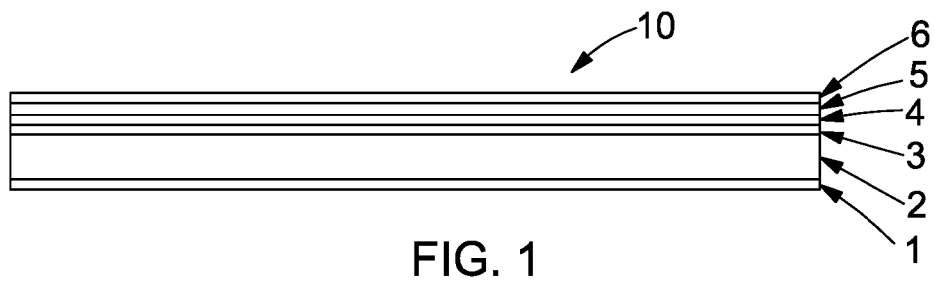

FIG. 1 illustrates a cross-section taken through the structure of a socket illumination apparatus 10. The apparatus 10 is a layered structure, including an emitting layer 2, which contains a photoluminescent material, a colour layer or film 4, and a protective top layer 6. The layers are joined by adhesive layers 3, 5. Any layers may comprise a single layer or multiple layers.

The photoluminescent material emits visible light in response to excitation (charging) by a different wavelength of light. The emitting layer 2 is a matrix formed by a synthetic resin or polymeric structure (for example a vinyl), with photoluminescent pigment distributed within the matrix.

The photoluminescent material may be excited by a single wavelength or a range of wavelengths from the electromagnetic spectrum. Similarly, it may emit a single wavelength or a range of wavelengths. The layers 3, 4, 5, 6 above the emitting layer 2 are configured to transmit the light required to excite the photoluminescent material, and to the light emitted. For example, the or each layer may be transparent or substantially transparent. The layers 3, 4, 5, 6 above the emitting layer may transmit all wavelengths required to excite the photoluminescent material, or only a sub-section of the wavelengths. Similarly, the layers 3, 4, 5, 6 above the emitting layer 2 may transmit all wavelengths emitted, or only a sub-section of the wave-lengths. If this is the case, the layers may act as a filter, altering the perceived colour of the apparatus 10.

The top layer of the layered structure is the protective layer 6 or protective topcoat. The protective layer provides a defense to stop the photoluminescent material being damaged in use. The protective layer 6 is also scratch resistant.

The protective layer 6 can be formed of any polymeric material with the required light transmission and scratch proof characteristics. For example, the protective layer may be a polycarbonate, polyester, polymethacrylate or polyurethane. The protective layer 6 can also be finished (e.g. polished) to provide a matte finish or gloss finish.

The intermediate colour film layer 4 is provided between the protective layer 6 and the emitting layer 2. The colour film layer 4 alters the colour the apparatus in different light conditions.

In normal lighting conditions, where the cabin is lit to approximate daylight (white light), the colour film provides a different colour appearance, from the ambient light reflecting from the colour film. The emission from the photoluminescent material may still be excited, but may be of low intensity compared to the light reflected by the colour film, such that the emission is negligible. As a result; the appearance of the film is determined by the reflective properties. Similarly, in low lighting conditions, the reflection from the film may be present, but low intensity compared to the emission, and so considered negligible and the appearance of the film is determined by the emitted light characteristics.

The emitting layer 2, colour film layer 4 and protective layer 6 all contribute to the appearance of the marker 10, and so may be considered functional layers. Adhesive layers 3, 5 are provided between the functional layers 2, 4, 6, to fix the structure together.

A further adhesive layer 1 is provided on the base of the structure, for attaching the layered structure to a substrate (not shown). The adhesive is not necessarily transparent, but may be. The adhesive layer may be opaque or partially opaque.

The apparatus can be used to illuminate a socket in low lighting conditions, for example, when an aircraft cabin is in "night mode". The photoluminescent material is chosen to be excited by wavelengths of light that are still available in such an environment, and to emit light that is easily discernible to passengers. The layers 3, 4, 5, 6 above the photoluminescent material are chosen to transmit these wavelengths, so that the light necessary for charging, and the light emitted can pass through.

An example photoluminescent pigment that may be used is Strontium Aluminate ($SrAl_2O_4$) doped with Europium and Dysprosium. This emits green light with a peak emission at approximately 520 nm.

Figure 2:
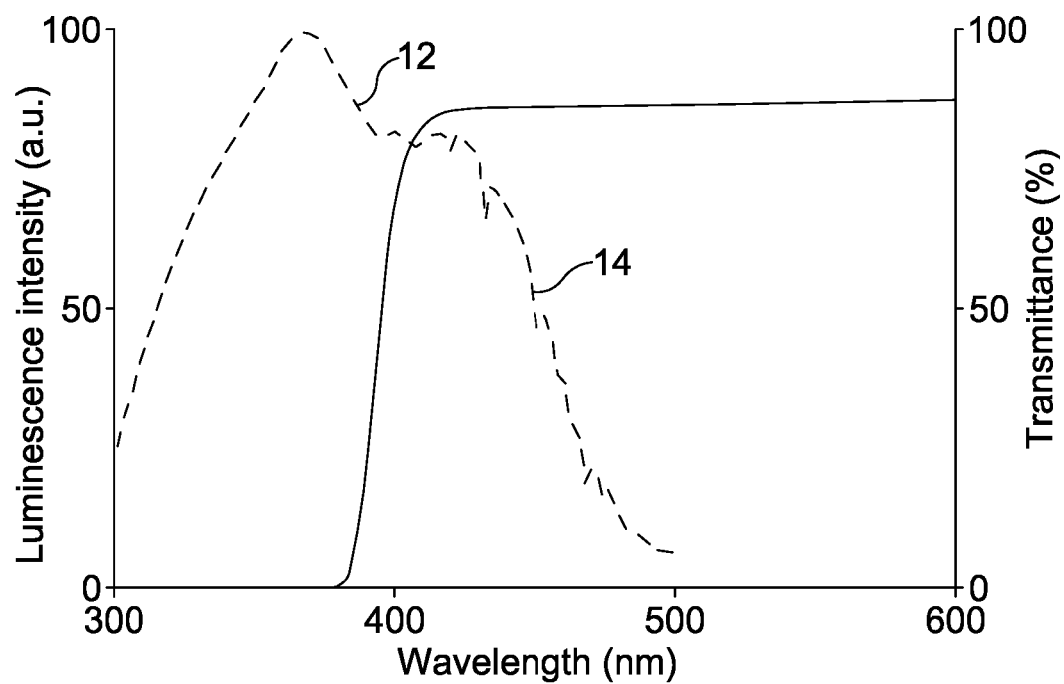
FIG. 2 illustrates excitation curves and transmission curves for an example pigment and protective layer.

The dashed line in FIG. 2 shows the excitation curve 12 for this pigment (left hand y-axis). The excitation curve shows the spectrum of light that can be used to charge the pigment. The solid line in FIG. 2 shows the transmission curve 14 for the protective layer 6 (right hand y-axis). This shows the wavelengths of light that the protective layer 6 allows to pass through the protective layer. The adhesive layers 3, 5 and colour film layer 4 have similar transmission characteristics.

As can be seen from FIG. 2, the excitation curve 12 and transmission curve 14 overlap between approximately 400 nm and 500 nm. This means the pigment can be charged by light in this range. The transmission curve also allows the light emitted by the example pigment to pass at 520 nm. In other examples the overlap may be different. It is envisaged that in some embodiments the photoluminescent material may be charged by UV light.

The above pigment is just one example of a pigment that can be used. Any suitable pigment can be used, and the emission does not necessarily have to be green. In some examples, different strontium aluminates may be used. By varying the composition of the strontium aluminate (the ratio of strontium to aluminium to oxygen), different emission colour can be obtained. Other pigments that can be used as single pigments or as mixtures with each other or with ($SrAl_2O_4$) doped with Europium and Dysprosium include $SrAl_2O_4$:Eu,Dy; $SrAl_4O_7$:Eu,Dy; $SrAl_{12}O_{19}$:Eu,Dy; $Sr_2Al_6O_{11}$:Eu,Dy; $Sr_4Al_2O_7$:Eu,Dy; $Sr_4Al_{14}O_{25}$:Eu,Dy; $Sr_7Al_{12}O_{25}$Eu, Dy.

In general, it is preferable to keep the excitation between 400 nm and 500 nm, as these wavelengths are present in low lighting conditions, but other excitation wavelengths can be used. UV excitation wavelength may be used in some circumstances.

The colour film may be any suitable colour, and may be chosen to match or complement airline logos or liveries. The colour film may be plain or may be patterned.

The appearance of the apparatus 10 from above can be controlled, so that it shows markings or indicia, for example, logos, symbols or guidance about the orientation of sockets.

In one example, the markings or indicia can be applied by only providing the photoluminescent material in a chosen pattern. In other examples, the emitting layer 2 or protective layer 6 may be printed to be opaque to the excitation and/or emission wavelengths. This means that from above, the emission is only seen in a chosen pattern.

In some informational signs the information may be printed on the emitting layer or on the protective layer. Printed areas typically block some or all of the emitted light enabling the eye to differentiate between the printed and non-printed areas and to read the information provided or to identify the signage. Typically printed areas will block from 40 to 100% of the emitted light. In one embodiment the printed area will block around 90% of the emitted light.

The structure of the apparatus given above is by way of example only, and any suitable structure may be used.

The coloured film layer 4 is optional, and may be omitted. In this case, only a single adhesive layer 3, 5 is necessary.

The application of markings or indicia is also optional, and may be omitted.

The apparatus is made by forming the layered structure, in any suitable manner, and then cutting to the desired shape and size. The cutting may be by a die cutting tool. In some examples, this can give a bezeled shape at the edge, and forms a hard edge down the side of the layered structure, making it hard to access and tamper with or damage the apparatus 10, accidently or purposefully.

The apparatus 10 can be used to mark any suitable socket 20. For example, the socket 20 may be a power socket or a USB port that can be used for charging a passengers electronic devices. The power socket may be a universal socket, or a particular type of socket (three pin or two pin). In another example, the socket 20 may be a headphone socket for an in-flight entertainment system.

FIGS. 3A and 3B show examples of a power socket 20*a* and a USB socket 20*b*, with a socket illumination apparatus 10 provided around the edge of the socket 20. In general, the sockets are formed in seating units (not shown). The seating units include a depression or aperture to receive the socket 20, and a channel is formed between the socket 20 and the edge of the depression or aperture. The socket illumination apparatus 10 can be sized and shaped to fit into this channel.

In this case, the substrate may be the base of the channel. Alternatively, a separate substrate may be provided, and the apparatus 10 may be fixed in the channel by any suitable means. For example, the apparatus 10 may be fixed by a snap fit, or by mechanical fixing or by adhesive.

FIGS. 4A and 4B show alternative examples of a power socket 20*a* and a USB socket 20*b*. In this case, the apparatus 10 is provided on the face of the socket 20. Here, the bezel may be used to provide an aesthetically pleasing appearance. The bezel also forms a hard edge down the side of the layered structure, making it hard to access and tamper with or damage the apparatus 10, accidently or purposefully.

In this case, the face of the socket 20 may form the substrate, or the apparatus may have a separate substrate may be provided, and the apparatus 10 may be fixed in the channel by any suitable means. For example, the apparatus 10 may be fixed by a snap fit to the edge of the socket, or by mechanical fixing or by adhesive.

Figure 5A:
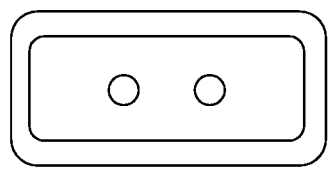
FIGS. 5A, 5B and 5C show application of the invention to a headphone socket, a remote control unit and a seat number.
Figure 5B:
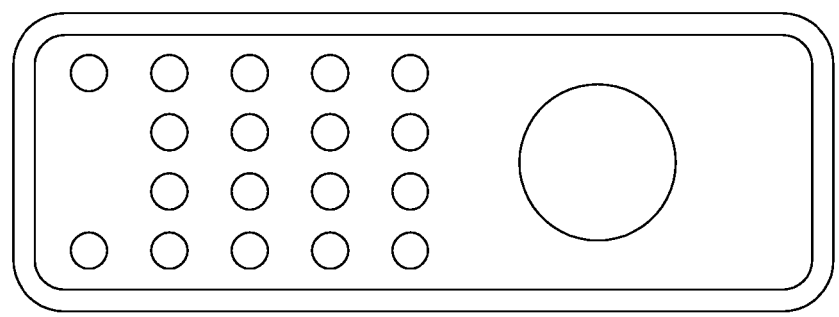
Figure 5C:
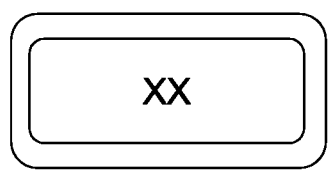

It will be appreciated that the use of the apparatus with sockets is by way of example only. The non-emergency illumination apparatus may be used with any article, fixture or fitting of an aircraft. FIG. 5A shows use of the illumination apparatus to mark the location of a headphone socket 30. FIG. 5B shows use of the illumination apparatus to mark the location of a remote control unit 40. FIG. 5C shows use of the illumination apparatus to mark the location of a seat number 50. Other applications and uses of the illumination apparatus will be apparent to those skilled in the art. For example, the illumination apparatus may be used to mark the location of no smoking signs on the PSU.

It will be appreciated that the illumination apparatus may be used instead of providing a lamp or other electrical light source behind the PSU buttons so saving on costs and weight in the aircraft. A combination of electrical and photoluminescent material may be utilised.

Figure 6:
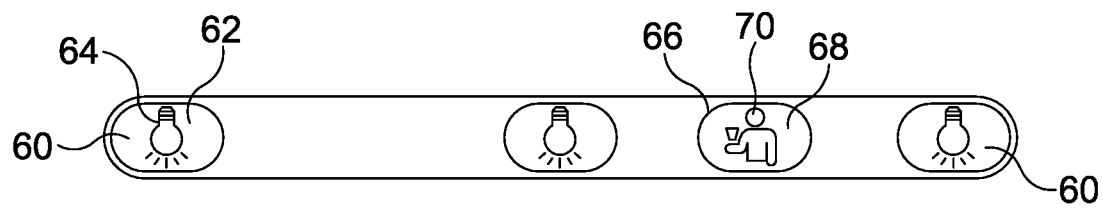
FIG. 6 shows application of the invention to a passenger service unit.

FIG. 6 shows an alternative use of the illumination apparatus on a PSU control panel. The illumination apparatus is used to mark the location of a light control switch 60. The illumination apparatus in this case comprises a decal fixed to the PSU over a switch for the reading light. The decal is has a colour film or filter to complement the colour of the PSU in the area generally indicated at 62 under daylight conditions and has a marking 64 indicating the function of the switch. In alternative embodiments the suitable pattern may be provided in a surface of the emitting layer. The decal emits light in low light conditions such that the location of the switch is clearly identified. The markings 64 may be arranged to be visible in low light conditions as well as in daylight.

The illumination apparatus 66 indicates a location of a cabin staff call button. The illumination apparatus comprises a decal with an area 68 arranged to have a colour under second lighting conditions (daylight or fully lit) that contrasts with the PSU and clearly identifies the location of the call button. Markings 70 identify the function of the call button. The markings 70 are additionally visible in the first lighting conditions (low light or dark). The decal for the call button may be arranged to emit a different colour light in the first lighting conditions compared to the light emitted by the decals for the reading lights.

The invention claimed is:

1. A socket for use in an aircraft cabin, the socket comprising:
   a connector for connecting a piece of user equipment to a central system of an aircraft; and
   a non-emergency illumination apparatus configured to illuminate the connector to mark a location of an article, fixture, or fitting in the aircraft cabin, the apparatus comprising:
   an emitting layer including a photoluminescent material, the photoluminescent material configured to emit visible light in a first region of the electromagnetic spectrum in response to excitation by light from a second region of the electromagnetic spectrum that differs from the first region; and
   a protective layer overlying the emitting layer, the protective layer transmitting light from the first and second regions of the electromagnetic spectrum;
   wherein the apparatus is configured to be placed in proximity to an article, fixture, or fitting, such that the apparatus marks the location of the article, fixture, or fitting when excited by light from the second region of the electromagnetic spectrum.

2. The socket of claim 1, wherein the light from the second region of the excitation spectrum is selected from the group consisting of:
 visible light;
 light from the violet or blue region of the visible spectrum; and
 light having a wavelength between 400 nm and 500 nm.

3. The socket of claim 1, wherein the photoluminescent material emits one of:
 visible light comprising green light;
 a range of wavelengths encompassing wavelengths which are close to wavelengths of maximum sensitivity of scotopic vision; or
 visible light including a range of wavelengths, with a maximum intensity at approximately 520 nm.

4. The socket of claim 1, wherein the emitting layer includes a matrix of a synthetic resin or polymeric structure, with the photoluminescent material distributed through the matrix.

5. The socket of claim 1, wherein the photoluminescent material comprises strontium aluminate and at least one material selected from the group consisting of $SrAl_2O_4$:Eu, Dy; $SrAl_4O_7$:Eu,Dy; $SrAl_{12}O_{19}$:Eu,Dy; $Sr_2Al_6O_{11}$:Eu,Dy; $Sr_4Al_2O_7$:Eu,Dy; $Sr_4Al_{14}O_{25}$:Eu,Dy; and $Sr_7Al_{12}O_{25}$Eu,Dy.

6. The socket of claim 5, wherein the photoluminescent material is selected to provide a performance of at least >50 mcd/m$^2$ after 10 mins according to DIN67510.

7. The socket of claim 1, further including a second color layer, provided between the emitting layer and the protective layer, wherein, in first light conditions, the apparatus appears a first color from the emitting layer, and in second, different light conditions, the apparatus appears a second color, different from the first.

8. The socket of claim 7, wherein the second light conditions include light emitted from a third region of the electromagnetic spectrum, wherein the third region:
 includes and extends beyond at least the second region of the electromagnetic spectrum; or
 includes the UV portion of the electromagnetic spectrum.

9. The socket of claim 7, wherein the second lighting conditions are daylight or white light.

10. The socket of claim 1, further comprising indicia or markings formed by selective placement of the photoluminescent material or by patterning regions of the protective layer to be at least partially opaque to light in the first region of the electromagnetic spectrum.

11. The socket of claim 10, wherein printed or patterned areas of the indicia or markings block from 40% to 100% of light emitted by the photoluminescent material.

12. The socket of claim 1, further comprising a color modifier, wherein the color modifier is in the form of a film.

13. The socket of claim 1, further comprising a substrate, the emitting layer being mounted on the substrate.

14. The socket of claim 1, wherein the apparatus is configured to be provided on a face of an article, fixture, or fitting.

15. The socket of claim 1, wherein edges of the apparatus include a bezel shape.

16. The socket of claim 1, configured to be provided in a channel formed between an article, fixture, or fitting and an edge of a depression or aperture that is configured to receive the article.

17. The socket of claim 1, wherein the article, fixture, or fitting comprises at least one of:
 power socket or power socket surrounds;
 USB socket or USB socket surrounds;
 headphone sockets or headphone socket surrounds;
 seat numbers;
 seat edges;
 remote control identifiers;
 overhead bin trims;
 overhead bin handle locators;
 informational signage;
 light switches and call switches (for flight attendants);
 passenger Service Unit (PSU) informational signs; or
 PSU call buttons/light switches.

18. A method comprising using the non-emergency illumination apparatus of claim 1 to mark a location of an article, fixture, or fitting in an aircraft cabin.

19. The method of claim 18, wherein the illumination apparatus further comprises color film or a color modifier configured such that the illumination apparatus has a first appearance in a first light condition and is further configured to modify an appearance of the illumination apparatus in a second light condition different from the first light condition.

20. The method of claim 18, wherein the illumination apparatus further comprises a protective layer selected such that the performance of the apparatus is not reduced below 5 mcd/m$^2$ after 10 mins.

21. The method of claim 18, further comprising retrofitting an aircraft with the non-emergency illumination apparatus.

22. The socket of claim 1, wherein the connector is selected from the group consisting of a power outlet, a USB outlet, and a headphone socket.

23. The socket of claim 22, wherein the socket is located on a seating unit.

* * * * *